United States Patent [19]

Moeller

[11] Patent Number: 4,523,127

[45] Date of Patent: Jun. 11, 1985

[54] CYCLOTRON RESONANCE MASER AMPLIFIER AND WAVEGUIDE WINDOW

[75] Inventor: Charles P. Moeller, Del Mar, Calif.

[73] Assignee: GA Technologies Inc., San Diego, Calif.

[21] Appl. No.: 517,570

[22] Filed: Jul. 27, 1983

Related U.S. Application Data

[63] Continuation-in-part of Ser. No. 463,144, Feb. 2, 1983, abandoned.

[51] Int. Cl.$^3$ .............................................. H01J 25/00
[52] U.S. Cl. ..................................... 315/4; 333/24 R; 333/230; 333/251; 372/2; 315/5; 315/5.29; 315/5.31; 315/39
[58] Field of Search ...................... 333/24 R, 113, 230, 333/251, 252, 254; 372/2; 315/3, 4, 5, 5.29, 5.31, 39, 3.6, 5.32

[56] References Cited

U.S. PATENT DOCUMENTS

| | | | |
|---|---|---|---|
| 2,745,984 | 5/1956 | Hagelbarger et al. | 315/4 |
| 2,746,036 | 5/1956 | Walker | 343/100 |
| 2,812,467 | 11/1957 | Kompfner | 313/455 X |
| 2,960,670 | 11/1960 | Marcatili | 333/10 |
| 3,102,211 | 8/1963 | Sturrock | 315/5.31 |
| 3,114,123 | 12/1963 | Kreuchen et al. | 333/252 |
| 3,252,034 | 5/1966 | Preist et al. | 313/107 |
| 3,254,261 | 5/1966 | Sturrock | 315/5.32 |
| 3,257,620 | 6/1966 | Roberts | 330/4 |
| 3,259,786 | 7/1966 | Phillips | 315/3 |
| 3,273,011 | 9/1966 | Brown | 315/34 X |

(List continued on next page.)

FOREIGN PATENT DOCUMENTS 1000479  1/1957  Fed. Rep. of Germany ...... 333/252

OTHER PUBLICATIONS

Symons, Robert S., et al., "An Experimental Gyro-TWT," Transactions on Microwave Theory and Techniques, vol. MTT-29, No. 3, Mar. 1981, pp. 181–184.

Baird, J. Mark, "Survey of Fast Wave Tube Developments," Technical Digest of International Electron Devices Meeting Sponsored by IEEE, Washington, D.C., 1979, pp. 156–163.

Ganguly, A. K. et al., "Analysis of Two-Cavity Gyroklystron," Int. J. Electronics, 1981, vol. 51, No. 4, pp. 503–520.

Vlasov, S. N. "Open Coaxial Resonators for Gyrotrons," Radio Engineering and Electronic Physics, vol. 21, 1976, pp. 96–102.

(List continued on next page.)

*Primary Examiner*—Saxfield Chatmon
*Attorney, Agent, or Firm*—Fitch, Even, Tabin & Flannery

[57] ABSTRACT

A cyclotron resonance maser microwave amplifier includes coaxial input and output waveguides. Coupling apparatus for cyclotron resonance maser microwave amplifiers and other microwave power systems is provided for transferring microwave power between first and second waveguides. Geometry permits unwanted modes to be effectively attenuated. The coupling apparatus includes first and second coaxial hollow metallic circularly cylindrical members. The first member forms a first waveguide section. A second waveguide section coaxial therewith is bounded internally by the first member, and externally by the second member. The first member has a plurality of apertures for transferring microwave power between the first and second waveguide sections. The apertures are small relative to the radius of the first member and are spaced around the circumference of the first member in a generally symmetrical array. The apertures may be located in a plurality of axially extending grooves arranged in a generally symmetrical array with a helical twist, and are substantially filled with dielectric inserts which have a relatively short length and small cross-sectional area. The inserts provide a hermetic seal so that the waveguides may contain different media, as desired. Coolant channels are provided adjacent the apertures to dissipate heat generated in the dielectric inserts.

35 Claims, 8 Drawing Figures

U.S. PATENT DOCUMENTS

| | | | |
|---|---|---|---|
| 3,299,364 | 1/1967 | Buchmiller et al. | 330/4 |
| 3,304,463 | 2/1967 | Wilbur et al. | 315/39 |
| 3,305,751 | 2/1967 | Brown | 315/34 |
| 3,334,265 | 8/1967 | Gerlach et al. | 315/3.6 |
| 3,341,733 | 9/1967 | Kantorowicz | 315/3.6 |
| 3,408,567 | 10/1968 | Kahn | 324/95 |
| 3,416,106 | 12/1968 | Webb | 333/98 |
| 3,431,453 | 3/1969 | Evans | 315/3.6 |
| 3,993,969 | 11/1976 | Gross | 333/98 P |
| 4,199,709 | 4/1980 | Alirot et al. | 315/4 |
| 4,200,820 | 4/1980 | Symons et al. | 315/4 |
| 4,210,845 | 7/1980 | Lebacqz | 315/5.25 |
| 4,253,068 | 2/1981 | Barnett | 330/4 |
| 4,282,458 | 8/1981 | Barnett | 315/4 |
| 4,286,239 | 8/1981 | Gross | 333/245 |
| 4,297,662 | 10/1981 | Gross et al. | 333/252 |
| 4,371,854 | 2/1983 | Cohn et al. | 333/252 |
| 4,388,555 | 6/1983 | Symons et al. | 315/4 |
| 4,460,846 | 7/1984 | Taylor | 315/5.38 |

OTHER PUBLICATIONS

Flyagin, V. A. et al., "The Gyrotron," IEEE Transactions on Microwave Theory and Techniques, vol. MTT-25, No. 6, Jun. 1977, pp. 514–521.

Hirshfield, J. L., et al., "The Electron Cyclotron Maser-An Historical Survey," IEEE Transactions on Microwave Theory and Techniques, vol. MTT-25, No. 6, Jun. 1977, pp. 522–527.

Marcuvitz, N., Waveguide Handbook, McGraw-Hill, 1951, pp. 72–80.

Miller, S. E., "Coupled Wave Theory and Waveguide Applications," The Bell System Technical Journal, May 1954, vol. 33, pp. 661–719.

Crompton, J. W., "A Contribution to the Design of Multi-Element Directional Couplers," Proceedings of the IEEE, vol. 104C, 1957, pp. 398–402.

Ganguly, A. K., et al., "Self-Consistent Large Signal Theory of the Gyrotron Travelling Wave Amplifier," Int. J. Electronics, 1982, vol. 53, No. 6, pp. 641–658.

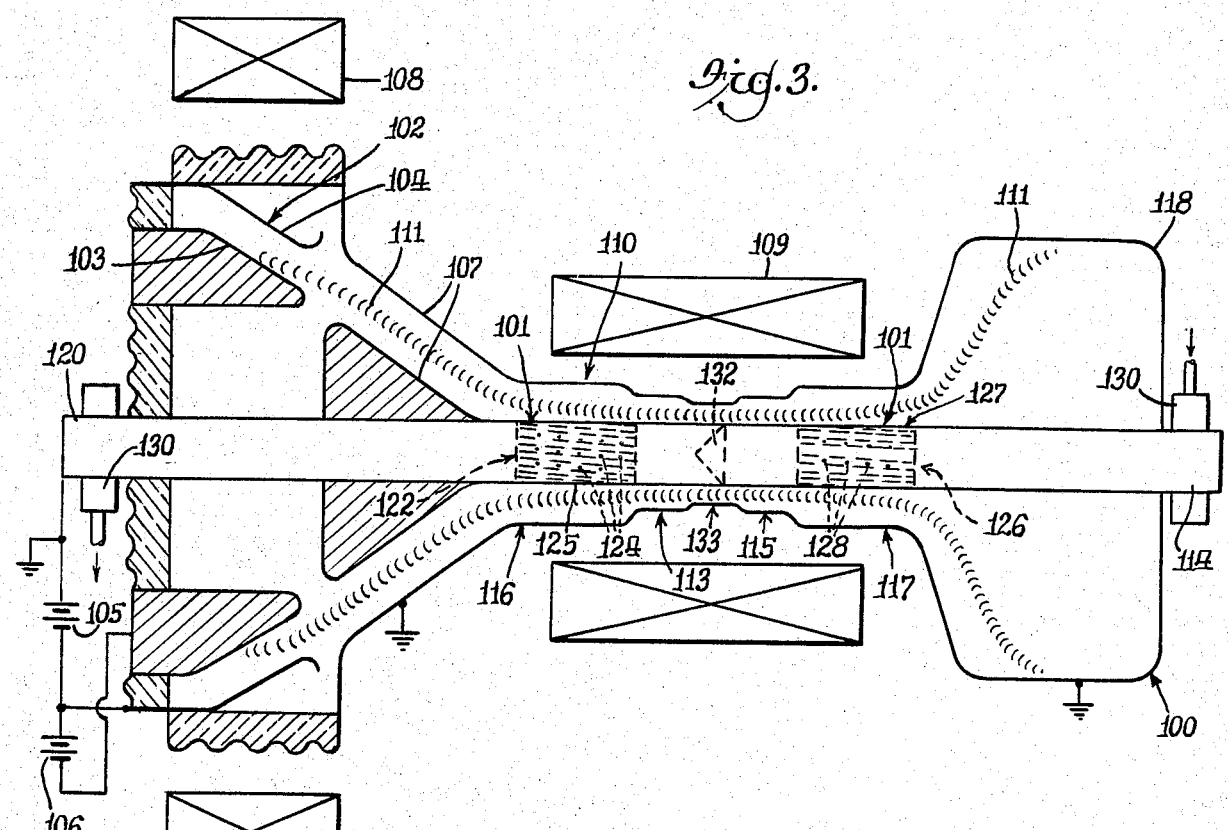
Fig. 3.
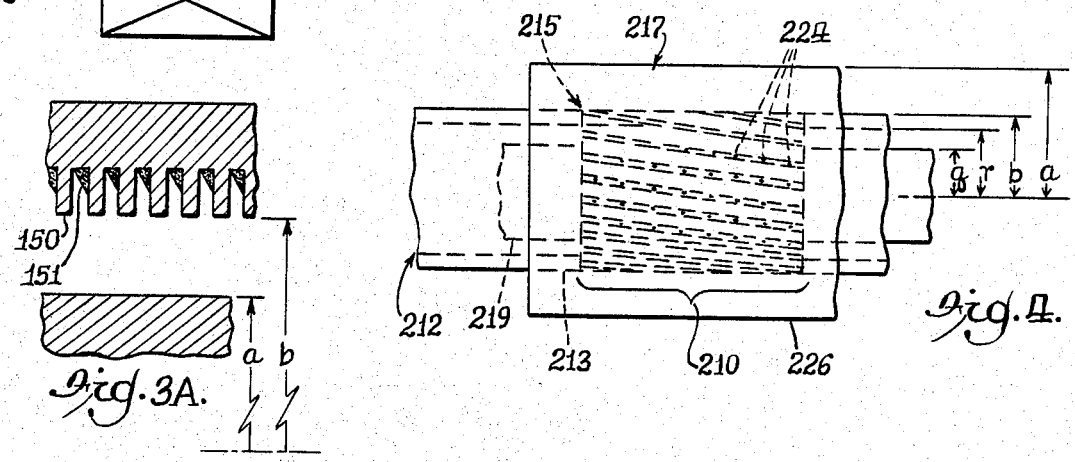
Fig. 3A.
Fig. 4.
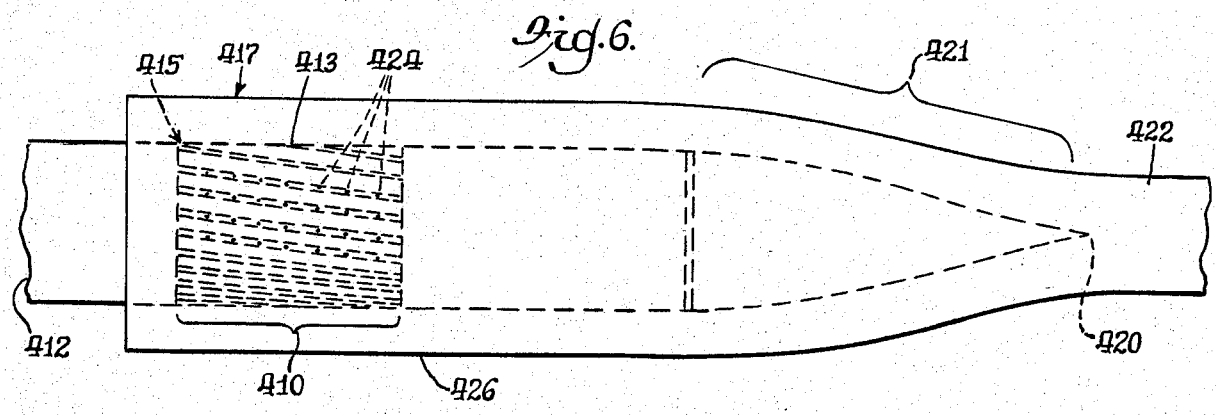
Fig. 6.

CYCLOTRON RESONANCE MASER AMPLIFIER AND WAVEGUIDE WINDOW

This is a continuation-in-part of application Ser. No. 463,144, filed Feb. 2, 1983, now abandoned.

BACKGROUND OF THE INVENTION

1. Field of the Invention

This invention relates to cyclotron resonance maser amplifiers and to waveguide windows in such devices and other microwave power devices, and more particularly, to windows which are capable of propagating high frequency, high power microwave energy without overheating, significant mode conversion, or excessive sensitivity to frequency.

2. Description of the Prior Art

A waveguide window in a microwave power system generally permits power to pass from one waveguide to a second waveguide, but presents a physical barrier between the two waveguides. The waveguides may contain different gases or have different pressure levels, and one or both waveguides may be evacuated. For example, in high power microwave vacuum devices, such as gyrotrons and the like, power is generally transferred between an evacuated chamber or waveguide in the device and a waveguide having a gaseous environment through one or more waveguide windows which provide a hermetic seal between the two media.

A window of the prior art may consist of a disk secured in a waveguide. At low frequencies and low power, the heat generated due to inherent dielectric loss may be dissipated by cooling the edge of the disk. However, as the frequency or power is increased, cooling becomes more difficult, because more heat is generated in the window. If the additional heat is not adequately dissipated, the window may overheat and fail.

Another known window has a pair of disks with a dielectric liquid flowing between them for cooling. At high frequency or high power, the coolant pressure and consequently the window thickness is increased significantly to dissipate the added heat generated. If the disks become several wavelengths thick, however, they become very frequency sensitive, particularly when used in microwave tubes, and sensitive to variations in the dielectric constant of the disk material. In addition, the heat transfer through the thick disks is poor.

A plurality of relatively small apertures have been used for transferring microwave power from a circular waveguide to a rectangular waveguide. Since each of the coupling apertures is small, if dielectric plugs are used to provide a seal, the plugs may be easily edge cooled, and the plurality of apertures may transfer high power in the megawatt range. However, mode conversion is likely to occur in such systems at the frequencies and powers of interest here, where many modes can propagate in the waveguide, because the power transfers through a single common wall of the two waveguides in a manner which is not symmetrical. Thus, there is a need for a waveguide window which is not excessively sensitive to frequency or material variations, may be easily cooled, and does not encourage mode conversion.

Waveguide windows have had application in cyclotron resonance maser devices, such as gyrotrons. See, for example, Flyagin, V. A., et al., "The Gyrotron," IEEE Transactions on Microwave Theory and Techniques, Vol. MTT-25, No. 6 June 1977, pp. 514–521, particularly FIG. 1, where microwave energy is extracted through an end window.

SUMMARY OF THE INVENTION

In keeping with one aspect of this invention, coupling apparatus is provided for transferring microwave power between first and second waveguides. The coupling apparatus includes first and second coaxial hollow metallic circularly cylindrical members. The first member forms a first waveguide section for coupling to the first waveguide, and the first and second members together form a second waveguide section which surrounds the first waveguide section and is coaxial therewith. The first member has a plurality of apertures for transferring microwave power between the first and second waveguide sections. The second waveguide section is provided for coupling to the second waveguide.

The first waveguide section is bounded externally by the first member, and the second waveguide section is bounded internally by the first member, and externally by the second member. The apertures in the first member are small relative to the radius of the first member and are spaced around the circumference of the first member in a generally symmetrical array. The apertures may be located in a plurality of axially extending grooves arranged in a generally symmetrical array with a helical twist. The apertures may be substantially filled with dielectric inserts which have a relatively short length and small cross-sectional area and provide a hermetic seal so that the waveguides may contain different media, as desired. Coolant channels are provided adjacent the apertures to dissipate heat generated in the dielectric inserts.

In an alternate embodiment, the first waveguide section is a coaxial waveguide having a third cylindrical member which is inside and coaxial with the first member. The first and third members form a coaxial waveguide section in place of the hollow cylindrical waveguide.

Accordingly, an aspect of the present invention is to provide a new and improved waveguide window for microwave tubes and other microwave power systems. Another aspect is to provide such a window which may be adequately cooled, is not excessively sensitive to frequency or material variations, and does not produce excessive mode conversion. Still another aspect is to provide new and improved apparatus for introducing and extracting the microwave power from the electron beam in a microwave tube, such as a gyrotron.

Still another aspect of the invention is to provide a cyclotron resonance maser system including successive input and output waveguides coaxial with the system. Microwave input energy is introduced through the input waveguide and laterally out a window into a beam of electrons having a substantial transverse energy which interact with the microwave energy and begin phase bunching. The bunching electrons drift through a drift tube that excludes microwave energy. The bunched electrons then radiate microwave energy, which is passed laterally through a window into the output waveguide, which carries the microwave energy out through the center of the electron collector of the maser system.

BRIEF DESCRIPTION OF THE DRAWINGS

The above-mentioned and other aspects and features of this invention and the manner of obtaining them will become more apparent, and the invention itself and its operation will be best understood, by reference to the following detailed description of the invention, particularly when taken in conjunction with the accompanying drawings, in which:

FIG. 3 is a side view, partly in axial section, of a cyclotron resonance maser amplifier system with a coaxial waveguide system which includes the window of FIG. 1;

FIG. 3A shows a fragmentary enlarged view of a cross section of one of the first and second interaction sections and the drift tube section shown in FIG. 3;

FIG. 4 is a side view, partly broken away, of an alternative embodiment of a waveguide system which includes the window of FIG. 1;

FIG. 6 is a side view of another alternative embodiment of a waveguide system which includes the window of FIG. 1.

DESCRIPTION OF PREFERRED EMBODIMENTS

Figure 1:
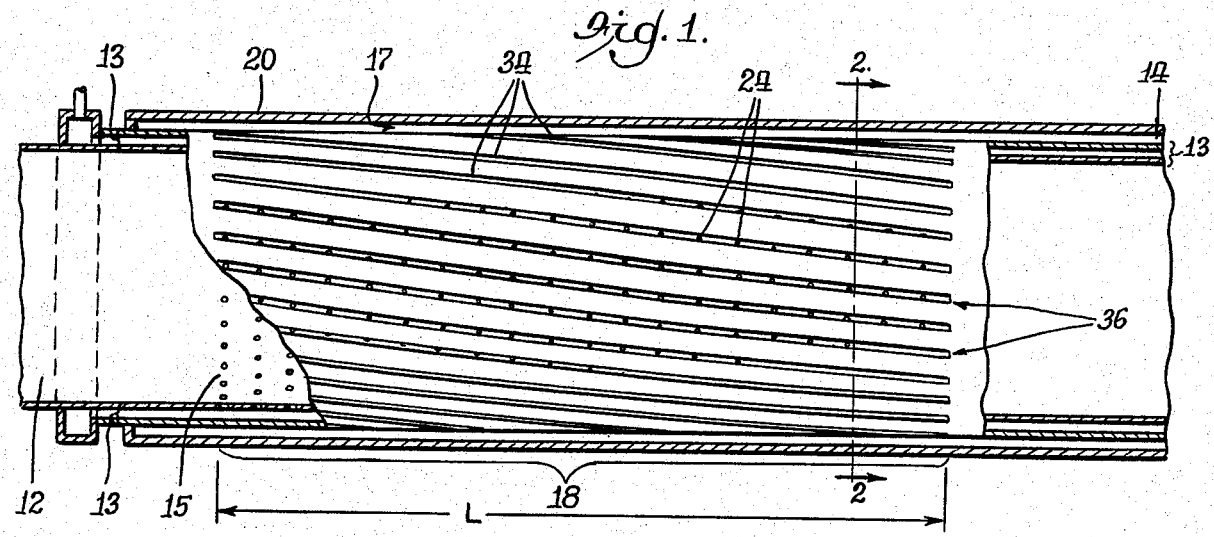
FIG. 1 is a side view, partly broken away and partly in axial section, of a waveguide system showing one embodiment of a window according to the invention.

A typical window made in accordance with this invention is shown in FIG. 1. Generally, microwave power is coupled from a waveguide 12 to a waveguide 14, or from the waveguide 14 to the waveguide 12, through a coupling apparatus or window 18. A first hollow metallic circularly cylindrical member 13 forms a first waveguide section 15 at the window 18 for coupling to the first waveguide 12. A second coaxial hollow metallic circularly cylindrical member 20 is provided which, in combination with the first member 13, forms a second waveguide section 17 surrounding the first waveguide section 15 at the window 18 and providing coupling to the second waveguide 14.

The first member 13 lies coaxially between the first waveguide section 15 and the second waveguide section 17, and forms a portion of each waveguide section. The first waveguide section 15 is bounded externally by the first member 13, and the second section 17 is bounded internally by the first member 13 and externally by the second member 20. The first member 13 has an inner radius r (FIG. 2), and the second member 20 has an inner radius a. The first member 13 forms a wall having a thickness $b - r$.

A plurality of generally axially directed grooves 34 are provided in the first member 13 in an array which is generally symmetrical around the member 13. While the degree of symmetry is dependent upon the design requirements of the system, a high degree of symmetry is preferred to reduce mode conversion, and it is suggested that the grooves be evenly spaced around the entire circumference of the member 13.

The grooves 34 include a plurality of apertures 24 preferably arranged in generally symmetrical rings around the circumference of the member 13. A relatively high degree of symmetry is preferred for the apertures, as well as for the grooves, and it is suggested that the apertures also be equally spaced around the circumference of the first member 13.

Figures 2, 2A:
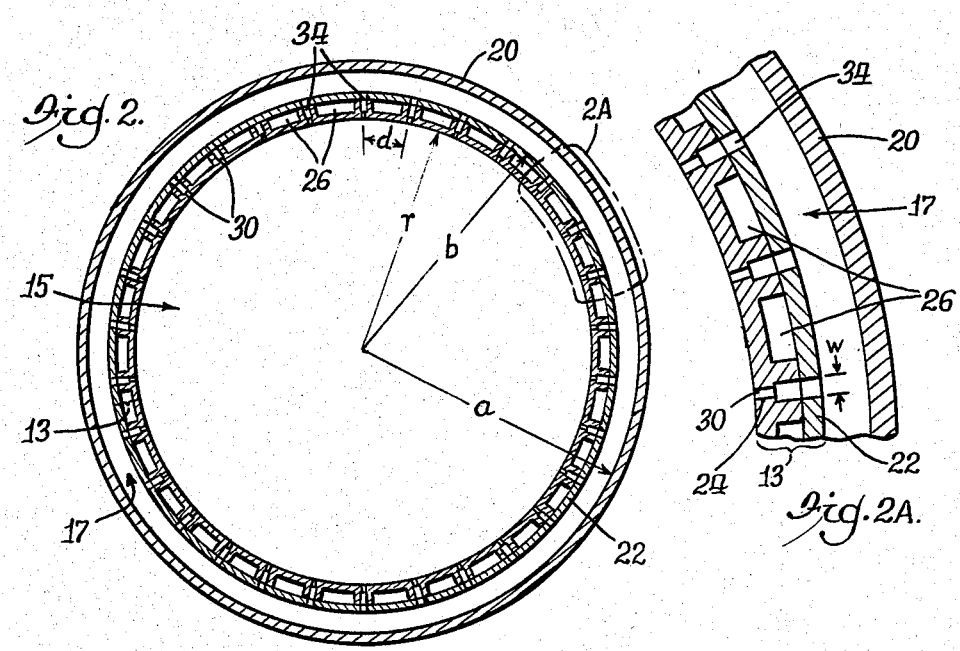
FIG. 2 is a transverse cross-sectional view of the system of FIG. 1, taken along line 2—2 in FIG. 1.
FIG. 2A is a fragmentary enlarged view of the system as shown in FIG. 2.

A plurality of coolant channels 26 within the member 13 lie adjacent the apertures 24 (FIG. 2). A sleeve 22 bounds and seals the channels 26, for containing the passage of gas or liquid coolant.

It is contemplated that the apertures 24 in the grooves 34 could be contiguous to form a plurality of strips which could be substantially filled with a dielectric material. Hermetic sealing may be more difficult, however, in such an embodiment.

The symmetry of the members 13, 20 in relation to each other, and the symmetry of the apertures 24 and the grooves 34 reduce mode conversion. Mode conversion may be further reduced by introducing a helical twist to the grooves 34, as seen in FIG. 1.

Each aperture 24 is closed by a dielectric insert 30. The inserts 30 may be of any suitable material, such as a ceramic and the like, which typically has a dielectric constant of about 6 to 9, or any suitable magnitude that will permit the transmission of microwave power. (The inserts are shown in full line, not in section, in FIGS. 2 and 2A.) It is preferred that the inserts 30 substantially fill the full length of the apertures 24, as power propagates poorly in any empty space in the apertures because they have a relatively small cross-sectional area relative to that required for propagation in vacuum, as will be seen.

The inserts 30 may be brazed or otherwise secured in the apertures 24 in any suitable manner to form a hermetic seal between the waveguide sections 15 and 17 and hence between the waveguide 12 and the waveguide 14. Under this condition, the waveguide 12 may contain a gaseous medium under any suitable pressure, and the waveguide 14 may contain a different gaseous medium under any suitable pressure. Alternatively, either waveguide may be evacuated, if desired.

The use of a plurality of relatively small apertures 24 permits the transfer of a substantial amount of power while permitting adequate edge cooling of the dielectric inserts 30. The members forming the coolant channels 26 are massive enough to maintain structural integrity and form channels providing adequate coolant flow, and the grooves 34 permit the inserts 30 to be small enough to reduce mode conversion and sensitivity to frequency and dielectric constant.

The coupling apparatus 18 permits the transfer of power from the waveguide 12 to the waveguide 14, or from the waveguide 14 to the waveguide 12. The system may be used in cyclotron resonance maser devices such as gyrotrons and the like, and may operate between about 28 GHz and 140 GHz, with a free space wavelength between about 1 cm and 2 mm. A gyrotron may typically operate at a frequency of about 60 GHz with a power output of up to about 1 MW. If used to heat the plasma in a fusion reactor, a gyrotron might typically operate at a frequency of about 120 GHz, with a power output of up to about 1 MW. Suggested dimensions given in this description will be related in a general manner to such a typical gyrotron system operating at 60 GHz with a power of about 1 MW.

The dimensions of the waveguides and elements of the windows of this invention are to a certain extent a matter of choice and may be determined empirically, but performance may be greatly improved by following the design guidelines suggested herein. It is desirable to permit the transfer of high power with low sensitivity to frequency and the properties of the dielectric material, and to control mode conversion. Structural integrity must be maintained, as well as effective cooling.

It is desirable to propagate microwave power in low loss modes, such as the circularly symmetrical, or $TE_{0,n}$ modes in cylindrical or coaxial waveguides. The $TE_{0,n}$ modes are also useful because they propagate in both cylindrical and coaxial waveguides. The loss in symmetrical modes is generally inversely proportional to the cube of the diameter of the waveguide. Thus, an increase in size greatly reduces loss. An increase in size also reduces power density, and problems related to electrical breakdown. In the high power, high frequency applications contemplated for this invention, relatively large waveguides are desirable, so that losses and power densities may be reduced in this manner. However, large waveguides are capable of propagating power in many modes. Unless properly controlled, mode conversion is likely to occur, which is undesirable for many applications, and may result in increased losses.

A typical inner diameter of the waveguide 12 and first member 13 for operation at about 60 GHz and 1 MW is about 2.5 inches. About 12 circularly symmetrical modes may propagate in the waveguide 12 and member 13 under those conditions in the embodiment of FIG. 1. The number of modes may be further reduced by using an inner member 219 shown in FIG. 4, as will be described. The choice of which mode to use depends upon how close to the cutoff wavelength the system is to operate. If the mode chosen is far from cutoff, then the attenuation is low, but the required length of the window 18 becomes large because it is more difficult to avoid exciting the other circular modes. Also, the wall currents are small, resulting in weak coupling per window aperture. If the mode chosen is closer to cutoff, the attenuation is greater, but the window 18 may be shorter.

Other dimensions of the system, such as a, b and r in FIG. 2, and the dimensions of the window 18, may be determined from an understanding of some basic microwave principles. For example, the wavelength $\lambda_g$ of the incident wave in a waveguide having a particular mode is determined in general by Equation (1):

$$\lambda_g = 2\pi \left( \frac{\omega^2}{c^2} - \left(\frac{\lambda_c}{2\pi}\right)^2 \right)^{-\frac{1}{2}} \quad (1)$$

where $\lambda_c$ is the cutoff wavelength of the mode under consideration, $\omega$ is the applied angular frequency, and c is the velocity of light. For a hollow circular cylinder, $\lambda_c$ for a symmetric mode is given by $P'_{0,n}/r$, where $P'_{0,n}$ is the first zero of the derivative of the $J_0$ Bessel function appropriate to the particular $TE_{0,n}$ mode presumed to be propagating in the waveguide, and r is the radius of the waveguide. Thus, for a given radius r, the wavelength $\lambda_g$ may be calculated for various modes. Also, the radius r may be chosen so that a given mode will have a particular wavelength.

The coupling per aperture increases as the ratio of the wavelength $\lambda_g$ to the wavelength $\lambda_{fs}$ of a wave in free space increases, which also increases axial discrimination against coupling to other modes and permits the window length to be shorter. In a gyrotron waveguide, a ratio of $\lambda_g/\lambda_{fs}$ of about 1.25 might be appropriate. At 60 GHz, $\lambda_{fs}$ is about 0.5 cm. Using the above equation and a table of Bessel function zeros, the $TE_{0,7}$ mode is found to have a wavelength $g$ such that $\lambda_g/\lambda_{fs}$ is about 1.22. A table of Bessel functions shows that $P'_{0,7}$ is about 22.7601 for that mode. $\lambda_c$ for that mode is then 0.8765 cm.

The radius a of the second member 20 of the second waveguide section 17 may be chosen so that a particular coaxial $TE_{0,n}$ mode is excited. The cutoff wavelength $\lambda_c$ of a symmetric mode in the second waveguide section 17 may be expressed approximately by Equation (2):

$$\lambda_c = 2(a-b)/(n-1), \quad (2)$$

where $n = 2, 3 \ldots$ In the example under discussion, the cutoff wavelength $\lambda_c$ of the coaxial mode must match that of the $TE_{0,7}$ mode. For the lowest mode, where $n=2$, $(a-b)$ must then equal 0.438 cm. The radius b may be about 6.85 cm, as will be seen, so that the radius a is about 7.288 cm. In this manner, the mode in the first waveguide section 15 will travel at the same speed as that in the second waveguide section 17, which permits efficient transfer of power between the waveguides.

The dielectric inserts 30 may be fabricated to propagate the $TE_{1,1}$ mode. The wavelength $\lambda_{gc}$ of the $TE_{1,1}$ mode in the inserts 30 may be determined from Equation (3):

$$\lambda_{gc} = 2\pi \left( \frac{\epsilon \omega^2}{c^2} - \frac{(P'_{1,1})^2}{s^2} \right)^{-\frac{1}{2}} \quad (3)$$

where $\epsilon$ is the dielectric constant of the insert, $P'_{1,1}$ is the first zero of the derivative of the $J_1$ Bessel function, and s is the radius of the insert, which is presumed to be the radius of the aperture. The radius of the inserts must exceed $(P'_{1,1})c/\sqrt{\omega\epsilon}$ to avoid cut off of the $TE_{1,1}$ mode, yet small enough to cut off most higher modes. A radius s of about 1/16 inch is suitable at 60 GHz.

Mode conversion in the window 18 may be controlled by choosing a sufficient length L for the apertured section of the window 18. The ability to separate two modes having guide wavelengths $\lambda_1$ and $\lambda_2$ is determined by their beat wavelength $\lambda_b$, which may be defined by Equation (4):

$$\lambda_b = 1/[1/\lambda_1 - 1/\lambda_2] \quad (4)$$

The wavelength $\lambda_b$ represents the distance over which the two waves are out of phase by one cycle (360°). In order to couple one mode without transferring significant power to the other mode, the window length should be at least $\lambda_b$. The minimum length would then be the largest possible value of $\lambda_b$ in Equation (5):

$$\lambda_b = \left\{ \left| \sqrt{\left(\frac{1}{\lambda_{fs}}\right)^2 - \left(\frac{P'_{0,7}}{2\pi r}\right)^2} - \sqrt{\left(\frac{1}{\lambda_{fs}}\right)^2 - \left(\frac{P'_{0,n}}{2\pi r}\right)^2} \right| \right\}^{-1} \quad (5)$$

for some n. The largest value of $\lambda_b$ is given by $P'_{0,6}$, for which $\lambda_b = 10.2$ cm in the example under consideration.

Thus, a window length L in FIG. 1 might be about 10.2 cm or greater.

The dielectric inserts 30 in the apertures 24 should be fairly thin to reduce frequency and material sensitivities, and should have a length which is a multiple of $\lambda_{gc}/2$, such as $(\frac{1}{2})\lambda_{gc}$, or $(1)\lambda_{gc}$. The inserts have a relatively small radius so that they may be effectively edge-cooled by the coolant in the coolant channels 26.

The distance d between any two apertures 24 in both the radial and axial directions is preferably near an odd multiple of $\lambda_g/4$, such as $(\frac{1}{4})\lambda_g$, $(\frac{3}{4})\lambda_g$ or $(5/4)\lambda_g$, to reduce reflection of the incident wave due to the constructive interference of small reflections from the plurality of the apertures. A distance of $(\frac{3}{4})\lambda_g$ or $(5/4)\lambda_g$ is preferable to maintain reasonable strength, and reduce the number of apertures required. While even spacing of the apertures 24 is not required, it is preferred to reduce mode conversion.

Another consideration regarding the distance d between apertures is the possible scattering of the incident wave of wavelength $\lambda_g$ by the periodic array of apertures. The possible scattered wavelengths $\lambda_s$ may be calculated from Equation (6):

$$1/\lambda_{s,n} = n/d + 1/\lambda_g \quad (6)$$

where n is any integer, and n=0 corresponds to the desired mode. Propagation can only occur if $|\lambda_{s,n}/\lambda_{fs}| > 1$. If $d < \lambda_{fs}/2$, only n=0 satisfies this condition, and no scattering is possible.

If it is not practical to make $d < \lambda_{fs}/2$, then d may be an odd multiple of $\lambda_g/4$. Scattering may still occur under these conditions, however, which is more easily controlled by making d as small as possible. If $d=(5/4)\lambda_g$, $\lambda_{s,-1}$ and $\lambda_{s,-2}$ are the only wavelengths other than $\lambda_g$ which correspond to propagation. In this condition, $\lambda_{s,-1} = 5\lambda_g$ and $\lambda_{s,-2} = 1.666 \lambda_g$. If either of these wavelengths is close to the wavelength $\lambda_g$ of some $TE_{0,n}$ mode in the circular waveguide, some power could be transferred from one waveguide section to an undesired mode in the other waveguide section, depending on the window length. By changing d or r slightly, the relationship between the scattered wavelengths $\lambda_{s,-1}$ and $\lambda_{s,-2}$ and the wavelength $\lambda_g$ of nearby circular modes may be changed so that the beat wavelength $\lambda_b$ is short enough so as to be avoided by an appropriately long window length.

The grooves 34 have cross-sectional dimensions, such as a width w in FIG. 2A, which is a substantially free parameter used to adjust coupling. The grooves 34 permit the use of a relatively thick member 13, with relatively small apertures and thin dielectric inserts.

To provide adequate, reliable cooling, the coolant channels 26 should be as wide in the angular direction and as thick in the radial direction as is practical. The wall of the member 13 should be at least about 4 mm thick to provide adequate space for the channels 26, and to maintain structural integrity. The combination of the grooves 34, the apertures 24 and the coolant channels 26 provides adequate cooling and structural integrity, without excessive mode conversion, or frequency or material sensitivity.

Although the microwave energy incident in the waveguide sections 15 or 17 is presumed to be in one of the $TE_{0,n}$ modes, the inserts 30 are generally able to excite $TE_{m',n'}$ modes in both waveguide sections 15 and 17, as previously discussed. This condition may result in undesired mode conversion if it is not properly controlled. Such control may be improved by properly choosing the number M of rows 36 of apertures 24 to optimize the angular mode discrimination of the window 18. If the $TE_{0,n}$ mode is in the coaxial waveguide, only $TE_{m',n'}$ modes may be excited in the cylindrical t waveguide for m'=0, M, 2M, etc. The minimum value of M required may be determined by considering a table of zeros of Bessel functions for various modes. For the example given in which the power in the second waveguide section 17 is to be transferred to the $TE_{0,7}$ mode to the waveguide section 15, and in which the coupling length is chosen to be sufficiently great so that the $TE_{0,6}$ and $TE_{0,8}$ modes are rejected, then all modes with a value of $P'_{m,n}$ between $P'_{0,6}$ and $P'_{0,8}$ may be excited with various amplitudes if M is not appropriately chosen, where $P_{m,n}$ is the first derivative of the Bessel function for m=0, 1, 2 ... and n=0, 1, 2 ... By examining a table of Bessel function zeros, it appears that the highest m in which this occurs is 23, so that the number of rows M should be at least about 25 or 30 for good angular mode discrimination. The number of rows M may be increased, if desired, for improved coupling. The number of rows M required for low mode conversion may be reduced by introducing a helical twist to the grooves 34 and the rows of apertures 24, as seen in FIG. 1.

FIG. 3 shows an embodiment of a window system 101 made according to this invention in which microwave power may be transferred to or separated from an electron beam in a portion of a cyclotron resonance maser device 100. In the illustrated embodiment, the cyclotron resonance maser device is shown as a gyrotron amplifier. Gyrotron oscillators and amplifiers have demonstrated high average power capability at millimeter wavelengths. The principles of various cyclotron resonance devices, and of gyrotrons in particular, are well known. See, for example, Flyagin, V. A., et al., 'The Gyrotron," IEEE Transactions on Microwave Theory and Techniques, Vol. MTT-25, No. 6, June 1977, pp. 514–521; Hirschfield, J. L., et al., "The Electron Cyclotron Maser—An Historical Survey," IEEE Transactions on Microwave Theory and Techniques, Vol. MTT-25, No. 6, June 1977, pp. 522–527; Symons, Robert S., et al., 'An Experimental Gyro-TWT," IEEE Transactions on Microwave Theory and Techniques, Vol. MTT-29, No. 3, March 1981, pp. 181–184; Ganguly, A. K., et al., "Self-consistent large signal theory of the gyrotron travelling wave amplifier," Int. J. Electronics, 1982, Vol. 53, No. 6, pp. 641–658; Ganguly, A. K., et al., "Analysis of two-cavity gyroklystron," Int. J. Electronics, 1981, Vol. 51, No. 4, pp. 503–520; and Baird, J. Mark, 'Survey of Fast Wave Tube Developments," Technical Digest of International Electron Devices Meeting sponsored by IEEE, Washington, D.C., 1979, pp. 56–163. The window of the illustrated embodiment may be used with substantially any type of electron beam microwave generator for separating microwaves from the electron beam.

As set forth in these references, in general the various cyclotron resonance maser devices involve an electron beam moving in an axial direction in an axial magnetic field. The electrons in the beam have a substantial motion transverse of axial and hence move generally helically along magnetic lines of flux. The electrons move through a waveguide, which may contain travelling or standing waves, wherein the electrons interact with microwaves, initiating phase bunching of the electrons. The bunching electrons drift through an isolating region that excludes microwave energy, into an output waveguide where the bunched electrons radiate microwave energy, which is extracted through a window.

In accordance with the present invention, microwave energy is introduced coaxially into the system through a first waveguide from which the microwave energy passes laterally through a window into the electron beam, which is annular. The microwave energy and the electrons interact in an interaction region, initiating electron bunching. The bunching electrons drift through a drift tube which does not pass the microwave energy and into an output interaction region wherein the bunched electrons radiate microwave energy. The radiated energy is extracted from the electron beam through a second window into an output microwave waveguide extending coaxially through the region of electron collection and out of the maser device.

In the embodiment of a gyrotron 100 as illustrated in FIG. 3, the gyrotron includes an assembly of components disposed successively along a common axis. A magnetron injection gun 102 is comprised of a conical cathode 103 and a surrounding gun anode 104. The gun anode 104 is held negative relative to ground by a first d.c. power supply 105. The cathode is held further negative by a second d.c. power supply 106. The final anode 107 is formed by the housing of the gyrotron 100 and is at ground potential. Hence, the anode 107 is positive relative to the magnetron injection gun 102. The magnetion injection gun 102 is immersed in a constant magnetic field produced by a magnet 108. A further constant magnetic field is applied by a magnet 109 disposed around a necked portion 110 of the anode-housing 107, with the resulting lines of magnetic flux extending substantially parallel to the axis of the gyrotron 100 in the necked portion and then expanding into the magnetron injection gun 102.

According to well known gyrotron principles as set forth in the above-noted references, electrons are emitted from the cathode 103 and are accelerated by the potential on the gun anode 104. The magnetic fields prevent the electrons from reaching the gun anode 104 and direct the electrons in an annular beam 111. The respective electrons have substantial motion transverse to the beam direction, and hence have substantial transverse energy, that is, energy transverse to the beam direction. They generally follow the lines of magnetic flux, spiralling around them. The lines of magnetic flux are directed to cause the electron beam 111, or at least a substantial portion thereof, to move into and through the necked portion 110 without striking the anode-housing 107.

The electron beam 111 enters the necked portion 110 through an input coaxial waveguide section 116, passes through an input interaction section 113, a drift tube section 133, an output interaction section 115, and an output waveguide section 117 into a collector 118. The magnetic field directs the electron beam to the walls of collector 118, where the energy remaining in the electron beam 111 is dissipated as heat.

The window system 101 is disposed axially of the necked portion 110. Microwaves are introduced into the gyrotron 100 through a waveguide 120 coaxial with the gyrotron. The microwaves enter a waveguide section 122 corresponding to the waveguide section 15 shown in FIG. 1. The waveguide 120 and section 122 may alternatively be coaxial waveguides with section 122 corresponding to section 215 in FIG. 4. The microwaves then pass out of the waveguide section 122 through apertures 124 in a window 125 into the waveguide section 16, whence they pass with the electron beam 111 into the input interaction waveguide section 113. The frequency of the input microwaves, the size of the waveguide section 113 and the strength of the magnetic field cause the microwaves and the electron beam 111 to interact and initiate phase bunching of the electrons according to the well known principles of the gyro-klystron or gyro-travelling wave amplifier (gyroTWT). The perturbed (bunching) beam continues through the drift tube section 133, which is cut off to propagation of transverse electric modes (with the exception of $TE_{m,1}$ modes, which are discussed below). This section may include a dissipative wall element to attenuate transverse magnetic modes and $TE_{m,1}$ modes, as set forth below in connection with FIG. 3A. The beam 111 then enters the interaction section 115, where it coherently radiates microwave energy, at a frequency determined by the bunching, again according to the well known principles of the gyro-klystron or gyro-TWT. The interaction sections 113 and 115 may contain standing or travelling waves depending on whether the device is analogous to a klystron, TWT, or twystron. The microwave power continues into the output waveguide section 117, where it is transferred through apertures 128 of a window 127 into a waveguide section 126, while the electron beam 111 continues into the collector 118. The waveguide section 126 is coupled to an output waveguide 114. The waveguide section 126 and the output waveguide 114 may alternatively be coaxial waveguides with section 126 corresponding to section 215 in FIG. 4.

Coolant channels (not shown) extend along the entire system, and an apparatus 130 provides a continuous supply of coolant. The waveguides 120, 114 may be contiguous, and may include an absorber 132 separating the two.

With the apparatus of FIG. 3, the manner in which the microwaves are separated from the electron beam 111 allows the use of a collector 118 which is large compared to those in current designs in which the microwave output passes through the collector, which must then be limited in size to avoid mode conversion. The combination of a completely coaxial geometry (a central waveguide system the entire length of the device) as shown in FIG. 3 with the coaxial window design is particularly advantageous because it allows the generated microwave power that is separated from the electron beam 111 to be transferred radially inward to a single waveguide. Furthermore, this geometry avoids the potentially serious problem of creating unintended resonances which would occur if the central coaxial member were interrupted, i.e., if a coaxial output region were combined with hollow cavities. Another advantage of this geometry is that the window will not reflect competing modes back into the output cavity, thereby raising their Q's and causing spurious oscillations. Rather, radiation in a mode or at a frequency which might not be completely transferred through the window will continue forward into the collector, which can be made a matched load, rather than being reflected back into the output cavity. This is in contrast to the present generation of gyrotrons, the windows of which can cause spurious oscillations by reflecting radiation at frequencies other than the design value.

This geometry offers additional advantages if this coaxial geometry is used to support the lowest symmetric TE coaxial mode, called the $TE_{0,2}$ mode by Marcuvitz; see N. Marcuvitz, Waveguide Handbook, pp. 77–78, McGraw-Hill, 1951. Since in either gyro-klystron or gyro-TWT operation, the interaction regions are only slightly beyond cutoff, the use of the $TE_{0,2}$ coaxial mode implies $(\lambda_{fs}/2) \leq (b-a) < \lambda_{fs}$, assuming $(b-a) < < b$, as would normally be the case, fs being the free space wavelength. In this case, all $TE_{m,n}$ modes for $\geq 2$ have higher cutoff frequencies that the $TE_{0,2}$ coaxial mode. This is very advantageous for the stable operation of a gyrotron device, since normally it is the modes having cutoff frequencies lower than that of the desired mode that prevent the device from operating with high efficiency. Furthermore, by making $(b-a) < (\lambda_{fs}/b)$, all $TE_{m,n}$ modes are cut off for $n \geq 2$, so that the drift section 133 can indeed be completely beyond cutoff, and a region preceding the input waveguide 116 can also be beyond cutoff to prevent microwave power from entering the electron gun region.

In the above discussion, two classes of modes have been ignored, the transverse magnetic (TM) modes and the coaxial $TE_{m,1}$ modes. There are generally modes in each class which have a lower cutoff frequency than the $TE_{0,2}$ mode. However, there are associated with both mode classes axial wall currents which allow them to be attenuated very strongly without affecting the symmetric modes such as $TE_{0,2}$, which have only transverse wall currents.

As shown in FIG. 3A, by making the outer wall of the drift tube section 133 or an interaction region 113, 115 of a series of metal rings 150 separated by resistive material 151, such as silicon carbide (such disk mode filters are well known), it is possible to strongly attenuate the coaxial $TE_{m,1}$ modes as well as the TM modes. An advantage of the coaxial geometry is that such mode filters are substantially more effective against $TE_{m,1}$ modes than they are against nonsymmetric TE modes in hollow waveguides, as can be seen from a comparison of the axial wall currents. Such information can be obtained from the expressions for the tangential magnetic fields at the waveguide wall for the various modes in, for example, the Marcuvitz reference.

In the embodiment shown in FIG. 4, a coupling apparatus 210 includes a first waveguide section 215 coupled to a coaxial waveguide 212. The first waveguide section 215 is bounded on the outside by a first member 213, and on the inside by an inner coaxial member 219 having a radius q. The first member 213 includes a plurality of apertures 224 having dielectric inserts, as previously described. A second waveguide section 217 surrounds the first waveguide section. It is a coaxial waveguide section formed by the first member 213 on the inside and by a surrounding coaxial member 226 on the outside.

The radius q of the inner member 219 may be chosen so that the cutoff wavelength $\lambda_c$ for the modes of interest in the waveguide section 215 and the second waveguide section 217 are equal, for efficient coupling. This may be accomplished generally with reference to Equation (7):

$$\frac{a-b}{n-1} = \frac{r-q}{n'-1} \quad (7)$$

where n and n' are integers $\geq 2$. The coaxial waveguide section 215 (FIG. 4) supports fewer modes than the cylindrical waveguide section 15 in FIG. 1, reducing the potential for mode conversion. Also, the smaller cross-sectional area of a coaxial waveguide section 215 gives stronger coupling per unit length as compared to that of a hollow waveguide. The coaxial member 219 need not extend indefinitely from the first waveguide section 215 into the first waveguide 212, and may taper down in the waveguide 212, so that at least a portion of the waveguide 212 may be a hollow cylindrical member.

Microwave power may enter from the first waveguide 212, and pass through the first waveguide section 215 and the apertures 224 into the second waveguide section 217. The first waveguide section 215 may have a different environment than the second waveguide section 217.

Figure 5:
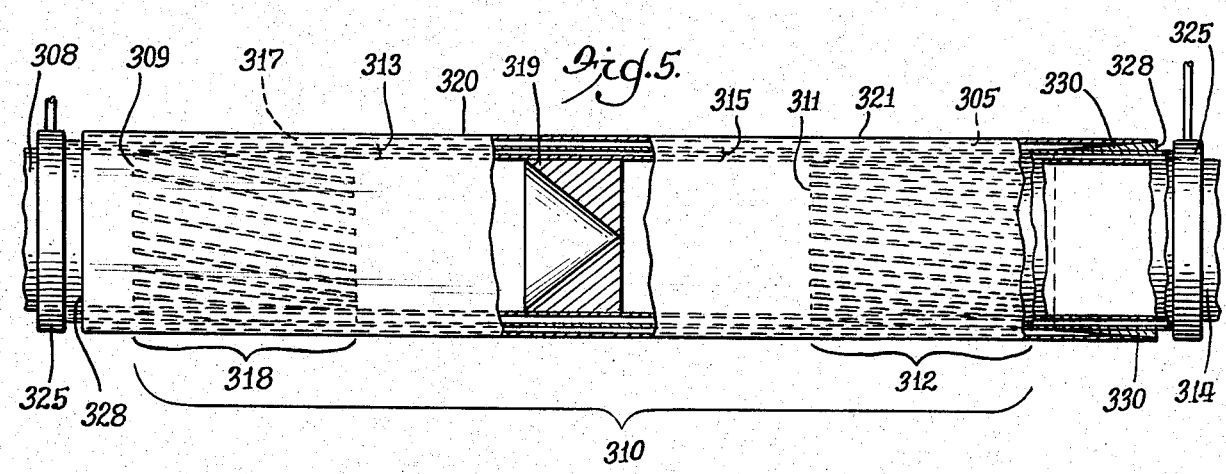
FIG. 5 is a side view, partly broken away and partly in axial section, of a waveguide system which includes two windows as shown in FIG. 1.

The coupling apparatus 310 shown in FIG. 5 includes two windows 318 and 312 which are similar to the window 18 shown in FIG. 1. The apparatus 310 couples power between first and second waveguides 308, 314, by way of a first waveguide section 309 corresponding to the first waveguide section 15 shown in FIG. 1, a second waveguide section 317 corresponding to the second waveguide section 17 shown in FIG. 1, a third waveguide section 305 which also corresponds to the second waveguide section 17 in FIG. 1, and a fourth waveguide section 311 which also corresponds to the first waveguide section 15. The apparatus 310 includes a first hollow metallic circularly cylindrical member 313 which is coaxial with a second member 320, a third member 321, and a fourth member 315 which is coaxial with the third member 321. The members 313, 320 are coaxial with and axially displaced from the third member 321 and fourth member 315. The first member 313 may be contiguous with the fourth member 315, and the second member 320 may be contiguous with the third member 321, if desired.

The member 313, like member 13, forms the first waveguide section 309, and the members 313 and 320, like members 13 and 20, form the second waveguide section 317. The third waveguide section 305 is formed of the members 315 and 321, like the second waveguide section is formed of members 313 and 320, and the fourth waveguide section 311 is formed of the member 315, like the first waveguide section is formed of the member 313. The second and third waveguide sections 317, 305 may be contiguous or otherwise coupled for transferring power therebetween. The first member 313 and the fourth member 315 have a plurality of apertures (not shown) in the respective windows 318 and 312 for transferring microwave power between the first waveguide section 309 and the second waveguide section 317 and between the third waveguide section 305, and the fourth waveguide section 311 and may include inserts for providing hermetic seals between the waveguide sections 309 and 317, and between the waveguide sections 305 and 311, if desired.

If the first member 313 and the fourth member 315 are contiguous, as shown in FIG. 5, an absorber and seal 319 may be used to provide a hermetic seal between the first waveguide section 309 and the fourth waveguide section 311, and to absorb uncoupled power. Seals 328 may be provided at or near the ends of the second waveguide section 317 to maintain any desired environment, and to prevent power leakage.

Microwave power may enter the window system of FIG. 5 from the first waveguide 308 into the first waveguide section 309, pass through the window 318 into the the second waveguide section 317, thence into third waveguide section 305, and through the window 312 into the fourth waveguide section 311. The power may leave the system through the waveguide 314. The absorber 319 absorbs microwave power to prevent reflection of untransferred power, and additional absorbers 330 may be provided in the second waveguide section 317 and the third waveguide section 305 for the same purpose. An apparatus 325 provides a gaseous or liquid coolant to the coolant channels (not shown) in the coupling apparatus 310.

The absorber 319 should be at least one diameter of the first member 313 away from the nearest apertures 324. The absorbers 319 and 330 may be of many known configurations and materials. A conical or other sloping shape reduces reflection, and silicon carbide and ceramic are suggested materials.

In the embodiment shown in FIG. 6, a coupling apparatus 410 includes a first waveguide section 415 coupled to a cylindrical waveguide 412. The first waveguide section 415 is bounded on the outside by a first member 413. The first member 413 includes a tapered end 420, and a plurality of apertures 424 having dielectric inserts, as previously described. A transition section 421 provides a smooth transition from an annular second waveguide section 417 to a cylindrical second waveguide 422. The second waveguide section 417 surrounds the first waveguide section. It is a coaxial waveguide section formed by the first member 413 on the inside and by a surrounding coaxial member 426 on the outside. The transition section 421 corresponds with and fits coaxially over the tapered end 420.

Microwave power may enter from the first waveguide 412, and pass through the first waveguide section 415, the apertures 424, the second waveguide section 417, and the transition section 421, into the second waveguide 422. The first waveguide section 415 may have a different environment than the second waveguide section 417.

The advantages of this invention are now apparent. The symmetrical shapes of the waveguides and the symmetrical distribution of apertures maintain mode purity, which may be further enhanced by the helical twist of the rows of apertures. The relatively short length of the dielectric inserts reduces frequency sensitivity and dielectric losses, and the grooves allow the wall between the waveguides to be relatively thick for structural integrity. The inserts may be adequately cooled by coolant in the coolant channels.

While the principles of the invention have been described above in connection with specific apparatus and applications, it is to be understood that this description is made only by way of example and not as a limitation on the scope of the claims of this invention.

What is claimed is:

1. Coupling apparatus for transferring microwave power between a given mode in a first waveguide and a given mode in a second waveguide, said coupling apparatus comprising first and second coaxial hollow metallic circularly cylindrical members, said first member forming a first waveguide section for coupling to said first waveguide, said first and second members forming a second waveguide section surrounding said first waveguide section and coaxial therewith for coupling to said second waveguide, said first waveguide section being bounded externally by said first member, and said second section being bounded internally by said first member and externally by said second member, said first and second members having respective radii at which a given mode in said first waveguide section propagates at substantially the same velocity as a given mode in said second waveguide section, and said first member having a plurality of apertures therethrough for transferring microwave power between said first and second waveguide sections, said apertures being small relative to the radius of said first member and spaced around the circumference of said first member.

2. Coupling apparatus according to claim 1 wherein said first waveguide section is bounded internally by an inner coaxial member extending coaxially inside said first member.

3. Coupling apparatus for transferring microwave power between a given mode in a first waveguide and a given mode in a second waveguide, and hermetically sealing one from the other, said coupling apparatus comprising first and second coaxial hollow metallic circularly cylindrical members, said first member forming a first waveguide section for coupling to said first waveguide, said first and second member forming a second waveguide section surrounding said first waveguide section and coaxial therewith for coupling to said second waveguide, said first waveguide section being bounded externally by said first member, and said second section being bounded internally by said first member and externally by said second member, said first and second members having respective radii at which a given mode in said first waveguide section propagates at substantially the same velocity as a given mode in said second waveguide section, and said first member having a plurality of apertures therethrough for transferring microwave power between said first and second waveguide sections, said apertures being small relative to the radius of said first member and spaced around the circumference of said first member, and dielectric inserts disposed within respective said apertures for hermetically sealing said first and second waveguide sections from one another.

4. Coupling apparatus according to claim 3 wherein said first waveguide section is bounded internally by an inner coaxial member extending coaxially inside said first member.

5. Coupling apparatus according to claim 3 comprising cooling means for edge cooling said inserts.

6. Coupling apparatus according to claim 5 wherein said cooling means comprises coolant channels adjacent said inserts, and means for passing coolant through said coolant channels.

7. Coupling apparatus according to claim 3 comprising a plurality of generally axially directed grooves, said apertures being in said grooves, and said grooves having a width and length sufficient for propagation of said power.

8. Coupling apparatus for transferring microwave power between a given mode in a first waveguide and a given mode in a second waveguide, said coupling apparatus comprising first and second coaxial hollow metallic circularly cylindrical members, said first member forming a first waveguide section for coupling to said first waveguide, said first and second members forming a second waveguide section surrounding said first waveguide section and coaxial therewith, said first waveguide section being bounded externally by said first member, and said second section being bounded internally by said first member and externally by said second member, said first and second members having respective radii at which a given mode in said first waveguide section propagates at substantially the same velocity as a given mode in said second waveguide section, and said first member having a plurality of apertures therethrough for transferring microwave power between said first and second waveguide sections, said apertures in said first member being small relative to the radius of said first member and spaced around the circumference of said first member, said coupling apparatus further comprising third and fourth hollow metallic circularly cylindrical members coaxial with said first and second members and axially displaced from said first and second members, said third and fourth members forming a third waveguide section for coupling to said second waveguide section to transfer microwave power between said second waveguide section and said third waveguide section, said third waveguide section being bounded externally by said third member and internally by said fourth member, said fourth member forming a fourth waveguide section coaxially within said third waveguide section for coupling to said second waveguide, said fourth waveguide section being bounded externally by said fourth member, said third and fourth members having respective radii at which a given mode in said third wave guide section propagates at substantially the same velocity as a given mode in said fourth waveguide section, said fourth member having a plurality of apertures therethrough for transferring microwave power between said third and fourth waveguide sections, said apertures in said fourth member being small relative to the radius of said fourth member and spaced around the circumference of said fourth member.

9. Coupling apparatus according to any one of claims 1 to 6 and 8 including means for passing an electron beam through said second waveguide section substantially parallel to the axis thereof.

10. Coupling apparatus according to any one of claims 1 to 6 and 8 wherein said apertures are substantially symmetrically disposed circumferentially about a respective said member in at least one plane transverse of the axis thereof.

11. Coupling apparatus according to claim 10 wherein said apertures lie in grooves in said respective said member, said grooves extending in a direction having a component parallel to the axis of said member.

12. Coupling apparatus according to claim 11 wherein there are a plurality of said apertures in each of said grooves.

13. Coupling apparatus according to claim 11 wherein said grooves have a helical twist.

14. Coupling apparatus according to any one of claims 1 to 6 and 8 wherein said apertures lie in grooves in a respective said member, said grooves extending in a direction having a component parallel to the axis of said member.

15. Coupling apparatus according to any one of claims 1 to 8 wherein at least one of said waveguide sections includes absorbing means spaced from respective said apertures in a direction away from a respective waveguide.

16. Coupling apparatus according to claim 15 wherein said absorbing means is spaced from respective said apertures at least one diameter of said first member.

17. Coupling apparatus according to any one of claims 1 to 7 wherein said first member includes a tapered end opposite said first waveguide, and said apparatus further comprises a transition section between said second waveguide section and said second waveguide for providing a smooth transition therebetween, said transition section having a hollow metallic member which corresponds with and fits coaxially over said tapered end.

18. A cyclotron resonance maser microwave amplifier comprising:
- an assembly of components disposed successively along a common axis and including successively and coaxially an annular source of electrons, circularly cylindrical walls forming an input waveguide section, circularly cylindrical walls forming a first interaction waveguide section, circularly cylindrical walls forming a drift tube section, circularly cylindrical walls forming a second interaction waveguide section, circularly cylindrical walls forming an output waveguide section, and an annular collector of electrons;
- means for forming electrons from said source into an annular beam of electrons having substantial transverse energy and directing said beam of electrons successively through said input waveguide section, said first interaction waveguide section, said drift tube section, said second interaction section and said output waveguide section to said collector, said means including magnetic means for producing magnetic lines of flux extending substantially parallel to said axis at least through said first and second interaction sections and said drift tube section;
- an input waveguide extending coaxially through said annular source of electrons for introducing input microwave energy into said amplifier;
- first coupling means for transferring input microwave energy from said input waveguide into said annular beam of electrons in said input waveguide section, said input waveguide providing means for transmitting microwave energy to said first interaction waveguide section, said first interaction section and said magnetic means providing means for causing said microwave energy and said electrons in said beam to interact to initiate phase bunching of said electrons, said drift tube section providing means for substantially decoupling said first interaction section from said second interaction section in respect to microwave energy while passing said bunching electrons to said second interaction section, and said second interaction section and said magnetic means providing means for causing the bunched electrons to radiate microwave energy and transfer the radiated energy to said output waveguide section, said walls forming at least one of said first and second interaction sections and said drift tube section including means for dissipating axial wall currents therein;
- an output waveguide extending coaxially through said annular collector for transmitting the microwave output from said amplifier; and
- second coupling means for transferring output microwave energy from said output waveguide section to said output waveguide.

19. A cyclotron resonance maser microwave amplifier according to claim 18 wherein said first coupling means comprises a hollow metallic circularly cylindrical first member coaxial with and within said input waveguide section, said first member having a plurality of apertures therethrough for transferring microwave energy to said input waveguide section, and said second coupling means comprises a hollow metallic circularly cylindrical second member coaxial with and within said output waveguide section, said second member having a plurality of apertures therethrough for transferring microwave energy to said output waveguide.

20. A cyclotron resonance maser microwave amplifier according to claim 19 wherein said apertures are small relative to the radius of the respective said member and are spaced around the circumference of the respective said member.

21. A cyclotron resonance maser microwave amplifier according to claim 20 wherein dielectric inserts are disposed within respective said apertures and hermetically seal them.

22. A cyclotron resonance maser microwave amplifier according to claim 21 further comprising cooling means for edge cooling said inserts.

23. A cyclotron resonance maser microwave amplifier according to claim 22 wherein said cooling means comprises coolant channels adjacent said inserts, and means for passing coolant through said coolant channels.

24. A cyclotron resonance maser microwave amplifier according to claim 18 wherein said input and output waveguides and said first and second coupling means each comprises inner and outer coaxial conductors.

25. A cyclotron resonance maser microwave amplifier according to claim 24 wherein said first coupling means comprises a hollow metallic circularly cylindrical first member coaxial with and within said input waveguide section, said first member having a plurality of apertures therethrough for transferring microwave energy to said input waveguide section, and said second coupling means comprises a hollow metallic circularly cylindrical second member coaxial with and within said output waveguide section, said second member having a plurality of apertures therethrough for transferring microwave energy to said output waveguide.

26. A cyclotron resonance maser microwave amplifier according to claim 25 wherein said apertures are small relative to the radius of the respective said member and are spaced around the circumference of the respective said member.

27. A cyclotron resonance maser microwave amplifier according to claim 26 wherein dielectric inserts are disposed within respective said apertures and hermetically seal them.

28. A cyclotron resonance maser microwave amplifier according to claim 27 further comprising cooling means for edge cooling said inserts.

29. A cyclotron resonance maser microwave amplifier according to claim 28 wherein said cooling means comprises coolant channels adjacent said inserts, and means for passing coolant through said coolant channels.

30. A cyclotron resonance maser microwave amplifier according to any one of claims 19 to 23 and 25 to 29 comprising a plurality of generally axially directed grooves in each of said members, said apertures being in said grooves, and said grooves having a width and length sufficient for the propagation of microwave energy.

31. A cyclotron resonance maser microwave amplifier according to any one of claims 19 to 23 and 25 to 29 wherein said apertures are substantially symmetrically disposed circumferentially about a respective said member in at least one plane transverse of the axis thereof.

32. A cyclotron resonance maser microwave amplifier according to claim 31 comprising a plurality of grooves in each of said members, wherein said apertures lie in grooves in said respective said member, said grooves extending in a direction having a component parallel to the axis of said member.

33. A cyclotron resonance maser microwave amplifier according to claim 32 wherein there are a plurality of said apertures in each of said grooves.

34. A cyclotron resonance maser microwave amplifier according to claim 32 wherein said grooves have a helical twist.

35. A cyclotron resonance maser microwave amplifier according to any one of claims 19 to 23 and 25 to 29 comprising a plurality of grooves in each of said members, wherein said apertures lie in grooves in a respective said member, said grooves extending in a direction having a component parallel to the axis of said member.

* * * * *

UNITED STATES PATENT AND TRADEMARK OFFICE
CERTIFICATE OF CORRECTION

PATENT NO. : 4,523,127

DATED : June 11, 1985

INVENTOR(S) : Charles P. Moeller

It is certified that error appears in the above-identified patent and that said Letters Patent is hereby corrected as shown below:

Column 1, line 68, after "No. 6" insert a comma.

Column 5, line 68, change "$_g$" to --$\lambda_g$--.

Column 6, line 37, change "$(P'_{1,1})c/(\overline{\omega\epsilon})$" to --$(P'_{1,1})c/(\omega\sqrt{\epsilon})$--.

Column 6, line 38, after "yet" insert --be--.

Column 6, lines 55-65, change "=", second occurrence, to -- - --.

Column 8, line 4, delete "t".

Column 8, line 16, before "By" insert a period.

Column 8, line 38, change "'The" to --"The--.

Column 8, line 44, change "'An" to --"An--.

Column 8, line 52, change "'Survey" to --"Survey--.

Column 8, line 55, change "56-163" to --156-163--.

Column 10, line 2, change "16" to --116--.

Column 10, lines 9-10, change "(gyroTWT)" to --gyro-TWT)--.

UNITED STATES PATENT AND TRADEMARK OFFICE
CERTIFICATE OF CORRECTION

PATENT NO. : 4,523,127
DATED : June 11, 1985
INVENTOR(S) : Charles P. Moeller

It is certified that error appears in the above-identified patent and that said Letters Patent is hereby corrected as shown below:

Column 11, line 6, change "fs" to $--\lambda_{fs}--$.

Column 11, line 8, change "$\geq 2$" to $--n \geq 2--$.

Column 11, lines 13-14, change "$(b-a-)<(\lambda_{fs}/b)$" to $--(b-a)<(\lambda_{fs}/2)--$.

Column 14, line 18, change "member" to --members--.

Signed and Sealed this

Fourteenth Day of January 1986

[SEAL]

Attest:

DONALD J. QUIGG

Attesting Officer

Commissioner of Patents and Trademarks